United States Patent [19]
Luedtke

[11] 3,741,010
[45] June 26, 1973

[54] TRACTOR PULLING DEVICE

[76] Inventor: Lloyd A. Luedtke, P.O. Box 123, Allenton, Wis. 53002

[22] Filed: Apr. 22, 9171

[21] Appl. No.: 136,407

[52] U.S. Cl. .............................................. 73/141 R
[51] Int. Cl. .............................................. G01l 5/13
[58] Field of Search ........................... 73/133, 141 R

[56] References Cited
UNITED STATES PATENTS

| | | | |
|---|---|---|---|
| 3,659,455 | 5/1972 | Watkins | 73/141 R |
| 3,491,590 | 1/1970 | Watkins | 73/141 R |
| 3,633,413 | 1/1972 | Case | 73/141 R |

Primary Examiner—Charles A. Ruehl
Attorney—Robert E. Clemency, John W. Michael, Gerrit W. Foster, Bayard H. Michael, Paul R. Puerner, Joseph A. Gemignani and Andrew O. Riteris

[57] ABSTRACT

Disclosed herein is a device which is adapted to be pulled by a tractor and which includes a frame supported, at the forward end, by a sled and, at the rearward end, by a set of ground engaging wheels, together with a cart movable along a track on the frame between the forward and rearward ends of the frame. Also disclosed herein is a drive means which is connectable between the cart and a ground engaging wheel for moving the cart along the track in response to travel of the wheel over the ground. In addition, the device disclosed herein includes provision for over-the-road transport and for automatically initiating driving movement of the cart from the rearward end to the forward end in response to the initial movement of the device at the beginning of a tractor pull.

12 Claims, 9 Drawing Figures

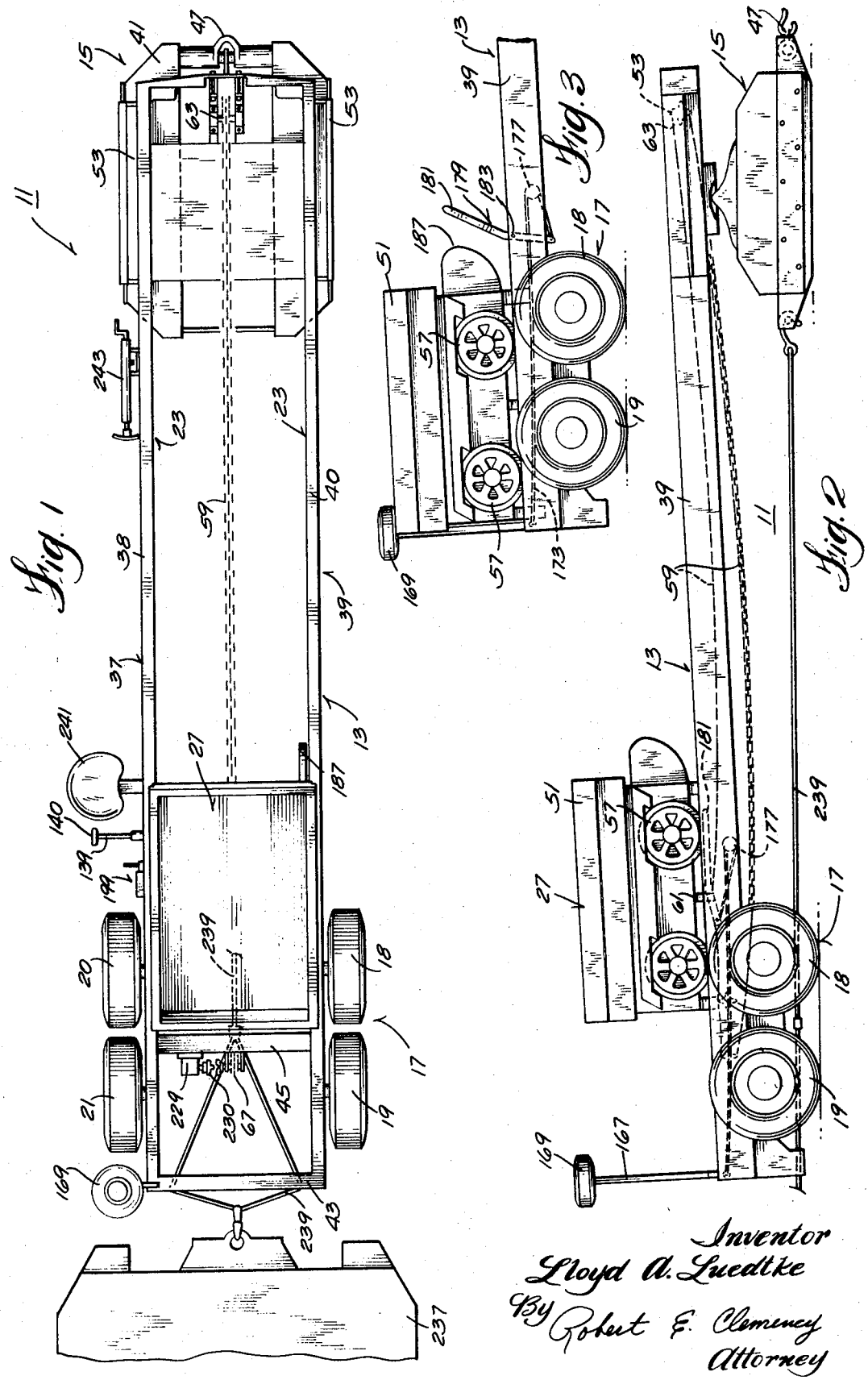

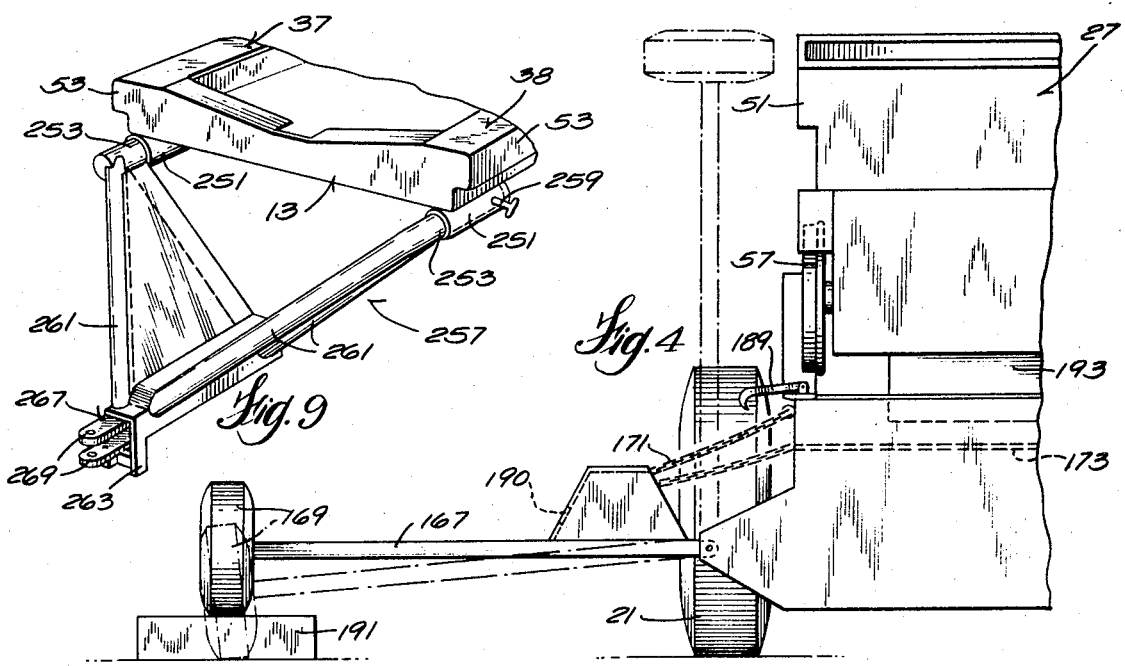
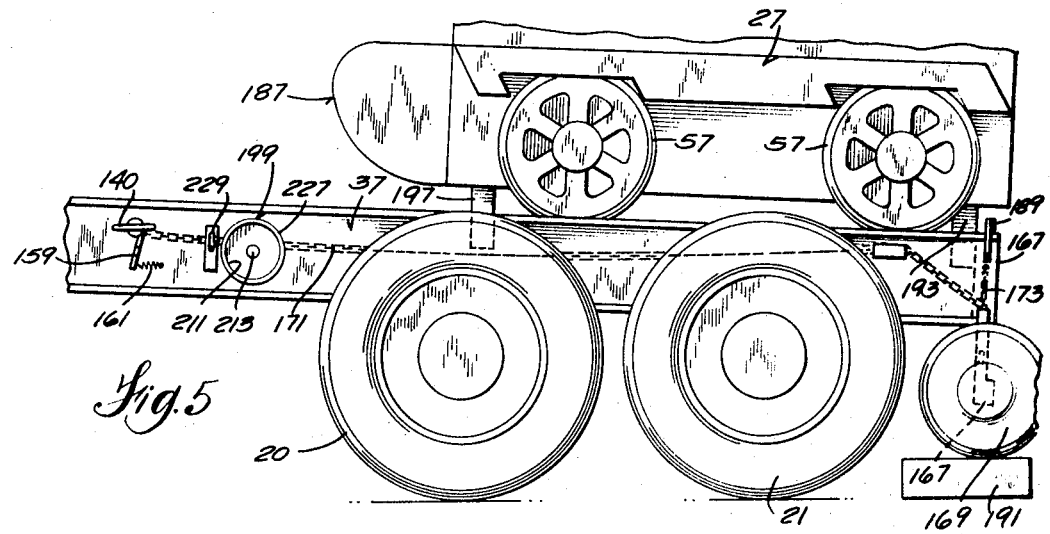
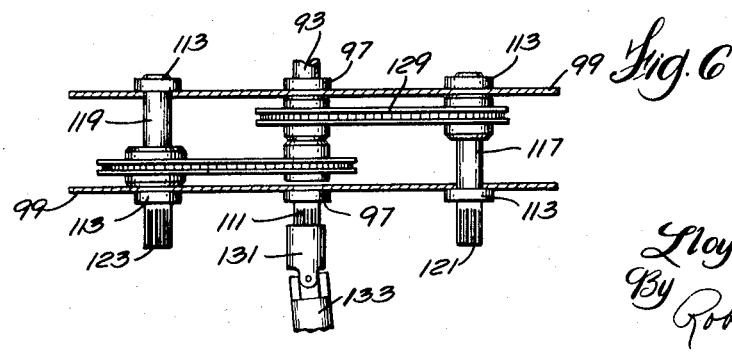

Inventor
Lloyd A. Luedtke
By Robert F. Clemency
Attorney

TRACTOR PULLING DEVICE

BACKGROUND OF THE INVENTION

The invention relates to devices employed in tractor pulling contests wherein several tractors are successively connected to a device in which a load is shifting along a frame from over a set of ground engaging wheels supporting the rearward end of the frame to a ground engaging sled which supports the forward end of the frame and is adapted to be pulled by a tractor. Movement of the weight toward the sled gradually increases the resistance offered to the tractor by the device being pulled. The relative pulling power of the competing tractors can readily be determined by measurement of the respective distances through which each of the tractors was able to pull the device.

Reference is made to the Watkins U.S. Pat. No. 3,491,590 issued Jan. 27, 1970, which shows one form of such a device. In the Watkins patent, a cable is anchored at one end to the ground and, at the other end, is connected to a movable weighted trolley on the device so as to effect trolley movement relative to the device in response to movement of the device away from the cable anchor.

SUMMARY OF THE INVENTION

One of the principal objects of the invention is the provision of a device which is adapted to be pulled by a tractor and which includes a drive operable between a ground engaging wheel and a movable weighted cart to produce cart movement in response to travel of the device over the ground and without connecting the device through a cable to a ground anchor.

Another of the principal objects of the invention is the provision of capability for over-the-road transport by a towing vehicle. In this regard, the device includes a sled and a frame which supports the movably weighted cart and which is releasably pivotally connected to the sled. In order to accommodate over-the-road travel, the frame also includes means for lifting the frame relative to the sled to effect disconnection therebetween and means for pivotally connecting the frame to an over-the-road towing vehicle for transport, with the sled removably carried either on top of the frame or by the towing vehicle.

Another of the principal objects of the invention is the provision of a device which is adapted to be pulled by a tractor and which is provided with means for automatically engaging a cart drive means between a ground engaging wheel and the movable weighted cart upon the beginning of each tractor pull. In this last regard, the drive arrangement is provided with a clutch which is biased toward engaged position and with a keeper bar which is biased into a position releasably retaining the clutch in non-engaged position. The device also includes means which is operable at the start of each tractor pull to effect release of the keeper bar so as to automatically effect engagement of the drive arrangement upon initiation of the pulling of the device.

Also in accordance with the invention, the means operable to effect automatic clutch engagement includes an arm movable between a fully extended position which effects keeper release and a retracted storage position. In this last regard, initial forward movement of the cart along the frame serves to effect automatic displacement of the arm from the fully extended position to the retracted storage position so as to avoid interference of the arm with travel of the device along the ground.

The drive arrangement of the invention also includes provision for variably adjusting the rate of travel of the weighted cart relative to the frame in response to any given rate of travel of the ground engaging wheel.

The invention also provides power means for returning the weighted cart from the forward end of the frame to the rearward end and braking means which can be employed to control the rate of cart travel under the influence of gravity and to lock the cart at any point along the track on the frame.

Also in accordance with the invention, the device is adapted to be pulled by a tractor by connecting the sled to the tractor. In addition, there is provided a second sled which is connectable directly to the first sled and therefor to the tractor, independently of the frame.

Other objects and advantages of the invention will become known by reference to the following description and accompanying drawings.

DRAWINGS

FIG. 1 is a plan view of a device which is adapted to be towed by a tractor and which embodies various of the features of the invention.

FIG. 2 is a fragmentary side elevational view of the device shown in FIG. 1.

FIG. 3 is a fragmentary view of an end portion of the device shown in FIGS. 1 and 2 with the cart shown in its rearwardmost position.

FIG. 4 is an enlarged, partial rear elevational view of the device shown in FIG. 1.

FIG. 5 is an enlarged fragmentary rear elevational view of the device shown in FIG. 1 but taken from the opposite side from that shown in FIG. 2.

FIG. 6 is an enlarged view, partially in section, of a portion of the device shown in FIG. 1 and illustrating a part of the arrangement for driving the cart along the track in response to travel of the device over the ground.

FIG. 9 is a perspective view of a towing vehicle adapted to facilitate transport over the road of the device shown in FIG. 1.

GENERAL DESCRIPTION

Figure 7:
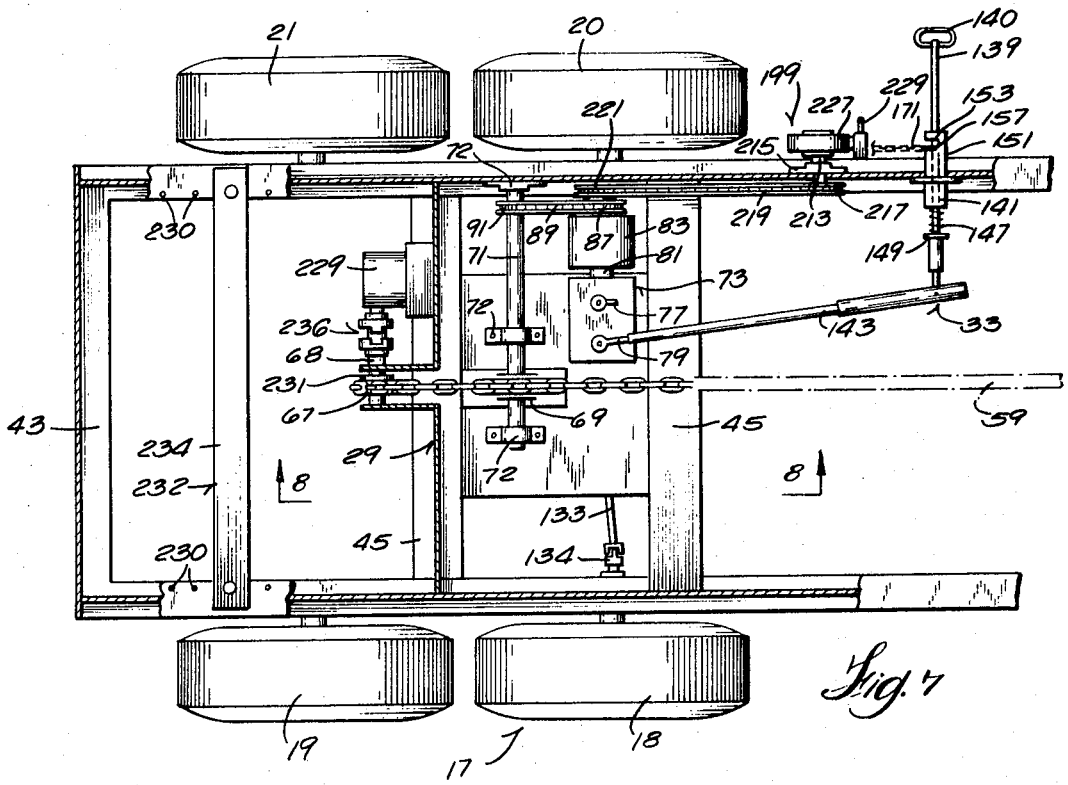
FIG. 7 is a fragmentary, enlarged, top plan view, partially in section and with parts omitted, of the rear end of the device shown in FIG. 2.

Illustrated in the drawings is a device 11 which is adapted to be towed by a farm tractor (not shown) or the like during a so-called "tractor pulling" contest and which embodies various of the features of the invention. In general, as shown in FIGS. 1 and 2, the device 11 includes a frame 13 supported at the front by a weighted sled 15 adapted to be pulled by the farm tractor and a wheel set or means 17 which includes four wheels 18, 19, 20, and 21 supporting the rear of the frame 13 and in rolling engagement with the ground. The frame 13 includes a track 23 along which a weighted cart 27 is movable so as to gradually transfer the weight of the cart 27 from the wheel set 17 at the rear of the frame 13 to the sled 15 at the front of frame 13. In addition, there is provided drive means 29 (See FIG. 7) connectable between the cart 27 and a ground engaging wheel for moving the cart along the track in response to travel of the wheel over the ground. While a different wheel could be employed, in the disclosed construction, the ground engaging wheel connected to the drive means 29 is the wheel 18 of the wheel set 17.

The drive means 29 also includes a clutch for disconnecting the ground engaging wheel 18 from the weighted cart 27 so as to afford travel over the ground without causing movement of the weighted cart 27 relative to the frame 13. Also provided is a clutch engaging arrangement 33 which is operable to effect clutch engagement upon the beginning of a "pull". The drive means 29 also includes means for varying the rate of travel of the cart on the track in response to ground travel of the wheel 18.

More particularly, while various frame constructions can be employed, as shown in FIGS. 1 and 2, the frame 13 comprises a pair of elongated I-beams 37 and 39 which include respective top flanges 38 and 40 which constitute the track 23 and which are suitably connected by a front transverse frame member 41, by a rear transverse frame member 43, and by one or more intermediate transverse frame members 45.

The sled 15 is adapted to be pulled along the ground by a tractor (not shown) and, in this regard, includes means 47 adapted for removable connection to the tractor, as for instance, by a chain and a hook. In addition, the forward end of the frame 13 and the sled 15 are releasably pivotally connected. While various means can be provided for releasably pivotally connecting the forward end of the frame to the sled, in the disclosed construction, a standard "over-the-road" tractor-trailer arrangement is employed with the sled being provided, on its upper surface, with a conventional so-called "5th-wheel" and with the frame supporting a conventional king pin removably received in the "5th-wheel".

The wheel set 17 and the sled 15 are suitably dimensioned such that the I-beams 37 and 39 are higher above the ground at the forward end of the frame 13 than at the rearward end of the frame 13.

The cart 27 can be constructed in various ways and is preferably weighted so that as the cart moves from the rear to the front of the frame 13 an increasing force is exerted between the sled 15 and the ground thereby making travel of the device over the ground progressively more difficult as the weighted cart moves from the rearward end to the forward end of the frame 13. In addition to being weighted itself, the cart preferably includes, on each side, horizontal hanger beams 51 (See especially FIG. 4) adapted for removably supporting a plurality of weights (not shown) of cast iron or other suitable material. As shown in FIGS. 1 and 2, similar hanger beams 53 are provided near the front end and on the outside of each of the I-beams 37 and 39. The cart 27 is supported for movement by a series of flanged wheels 57 which, in turn, are guided for movement along the upper flanges 38 and 40 of the respective I-beams 37 and 39, which flanges 38 and 40 constitute the track 23.

Although various arrangements can be employed, in particular accordance with the invention, the drive means 29 for displacing the weighted cart 27 along the track 23 includes (See FIGS. 1, 2 and 7) a link chain 59 which is suitably connected to the weighted cart 27 so that chain movement causes corresponding cart movement. While various arrangements can be employed, in the disclosed construction, the chain 59 is fixedly connected to a lug 61 (FIG. 2) depending from the weighted cart 27. At the forward end of the frame 13, the chain 59 is trained around an idler sprocket 63 which is suitably rotatably mounted on the frame 13. At its rearward end, the chain 59 is trained around a sprocket 67 on a shaft 68 rotatably mounted by the frame 13. Near the rearward end, the chain 59 is trained around (See FIG. 7) a drive sprocket 69 which is carried on a transversely extending drive shaft 71 suitably supported by bearings 72 on the frame 13.

As already indicated, means are provided in the drive arrangement 29 for detachably driving the chain 59 from the wheel 18 in response to movement of the wheel 18 over the ground and at variably selectable speeds.

While various arrangements can be provided, in the disclosed construction, the drive means 29 includes (See FIG. 7) a clutch which is part of a conventional clutch and transmission unit 73 which, in addition to the clutch, also includes a four-speed transmission having an operating lever 77 movable selectively between four operating positions. The clutch embodied in the clutch and transmission unit 73 also includes an operating lever 79 movable between a position in which the clutch is engaged and a second position in which the clutch is disengaged. If desired, a clutch without a variable transmission or gear box can be employed.

Extending from the clutch and transmission unit 73 is an output shaft 81 which is journaled in a bracket 83 on the frame 13 and which has fixedly mounted thereon a sprocket 87 connected by a chain 89 to a sprocket 91 fixedly carried on the transverse drive shaft 71. Accordingly, the output of the combined clutch and transmission unit 73 is applied to drive the link chain 59 to move the weighted cart 27 along the track 23.

Also extending from the combined clutch and transmission unit 73 is an input shaft (not shown) which is suitably drivingly connected to a central shaft 93 (See FIG. 6) which is suitably journaled in spaced bearings 97 on spaced depending vertical frame members 99 and which, at its outer end, is provided with a projecting splined part 111. Also carried in parallel relation to the central shaft 93 by suitable bearings 113 on the vertical frame members 99 are forward and rearward stub shafts 117 and 119 each also having, at one end thereof, respective projecting splined parts 121 and 123.

Figure 8:
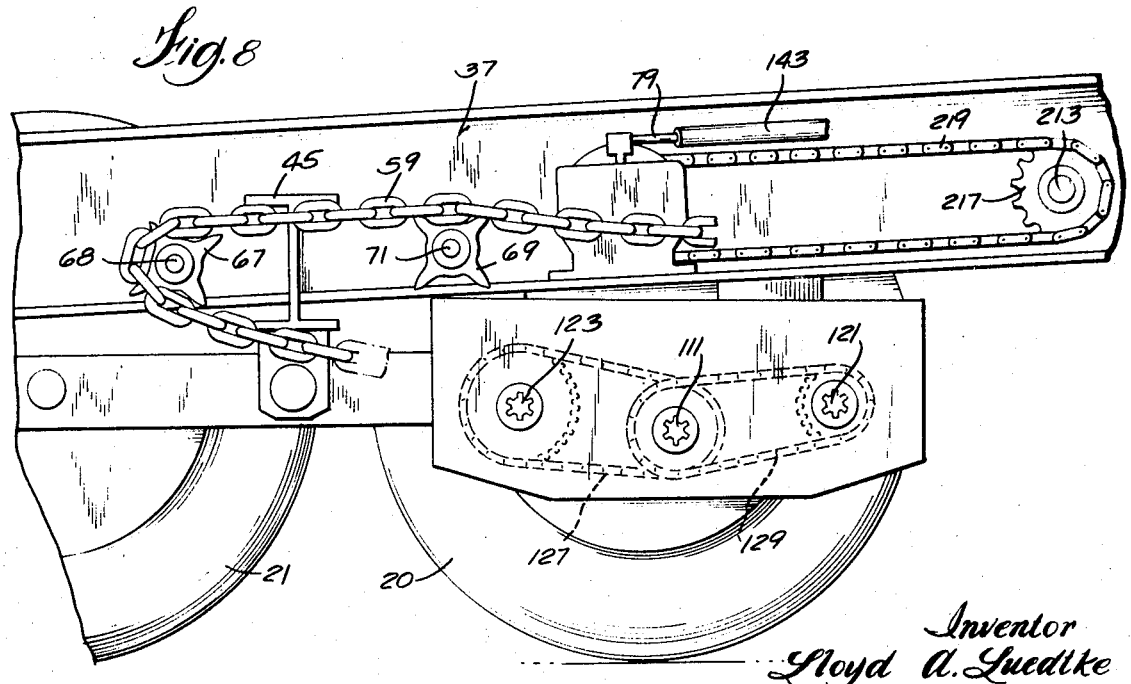
FIG. 8 is an enlarged fragmentary view taken generally along line 8—8 of FIG. 7, of a portion near the rear of the device shown in FIG. 1.

The rearward stub shaft 119 is connected (See FIG. 8) to the central shaft 93 by a chain drive 127 such that the central shaft is afforded a greater rate of rotation than the rearward stub shaft 119. In addition, the forward stub shaft 117 is connected to the central shaft 93 by a chain drive 129 such that the central shaft 93 is afforded a lesser rate of rotation than the forward stub shaft 117.

As shown in FIG. 6, the projecting splined parts 111, 121, and 123 of the stub shafts 93, 117, and 119 are selectively and removably received in a socket 131 which is universally pivotally connected to a telescopic shaft 133 which, in turn, is rotatably driven by the wheel 18 through a second universal joint 134 (See FIG. 7). Accordingly, the rate of travel of the weighted cart 27 can be varied by selectively changing the connection of the socket 131 with the shafts 93, 117, and 119.

As the combined clutch and transmission unit 73 offers a choice between four speed variations, the overall drive arrangement 29 affords 12 variable cart speeds for any given rotative speed of the wheel 18. The weighted cart 27 can, accordingly, be caused to move forwardly along the track 23 at a very slow rate as the device 11 moves forwardly along the ground or, the weighted cart 27 can be selectively caused to move at one of eleven more rapid speeds as the device 11 travels forwardly along the ground. This speed variation provides the device 11 with a significant degree of flexability to accommodate tractors of differing capacities and to accommodate pulling fields of differing lengths.

Means are provided for biasing the clutch toward the engaged position and for releasably holding the clutch in the disengaged position. While various arrangements can be employed, in the disclosed construction, such means includes (See FIG. 7) a clutch actuating rod 139 which is supported for axial movement transversely of the frame 13 by a bearing block 141 having a central aperture receiving the rod 139. At its outer end, the rod 139 is provided with a handle 140, and at its inner end, the rod 139 is pivotally connected to a telescopic extension 143 of the clutch operating lever 79. The clutch actuating rod 139 is biased inwardly to locate the clutch operating lever 79 in the clutch-engaged position by a helical spring 147 which surrounds the rod 139 and is seated between a collar 149 on the rod 139 and the bearing block 141.

While various arrangements can be employed for releasably retaining the clutch actuating rod 139, against the action of the spring 147, and in the position maintaining clutch disengagement, in the disclosed construction, such means includes (See especially FIGS. 5 and 7) formation of the bearing block 141 with a cylindrical portion 151 which extends through the I-beam 37 and is provided with a flat or groove 153 affording access to the clutch actuating rod 139. In addition, the clutch actuating rod 139 includes a circumferentially and radially extending groove 157 which releasably receives a keeper bar 159 pivotally mounted on the I-beam 37. The keeper bar 159 is biased into a position releasably containing the keeper bar 159 in the groove 157 by a spring 161 connected between the keeper bar 159 and the frame 13. Accordingly, movement of the keeper bar 159 out of the groove 157 and against the action of the spring 161 affords engagement of the clutch under the influence of the spring 147.

In order to insure that all tractors in a "pulling" contest start from the same position under the same circumstances, in accordance with the invention, the device 11 includes means for withdrawing the keeper bar 159 from the groove 157 and against the action of the spring 161 to automatically engage the clutch at the start of each pull. While various arrangements can be employed to engage the clutch at the start of each pull, in the disclosed construction, such means includes (See FIGS. 4 and 5) an arm 167 which is pivotally mounted at the rear of the frame 13 and which, at its outer end, preferably includes a rotatably mounted wheel 169. The arm 167 is pivotally movable between a first or extended position (shown in dotted outline in FIG. 4) with the arm 167 projecting laterally adjacent to the ground and with the wheel 169 in engagement with the ground and a second or storage or retracted position (shown in FIG. 2, as well as in dotted outline in FIG. 4) with the arm 167 extending vertically so as to be out of the way of any obstacle close to the tractor and the path of the device 11.

Means are provided for operably connecting the keeper bar 159 to the arm 167 so that movement of the arm 167 to the fully extended position automatically effects clutch engagement. While various arrangements can be employed, in the disclosed construction, such means includes a wire or chain 171 which is connected, at one end, to the keeper bar 159 and, at the other end, to the arm 167 and which is guided for movement by suitable means. In this regard, when the arm 167 moves to its fully extended position, the chain 171 is pulled so as to remove the keeper bar 159 from the groove 157 in the clutch actuating rod 139, thereby automatically effecting clutch engagement.

Means are also provided for automatically retracting the arm 167 to its second or storage or vertical position after engagement of the clutch. While various arrangements can be employed, in the disclosed construction, movement of the weighted cart 27 from its rearwardmost position effects movement of the arm 167 from the fully extended position to the retracted vertical position. More particularly, the arm 167 also has connected thereto another wire or chain 173 which is guided for travel by suitable means and which is trained (See FIG. 3) around a pulley 177 mounted on the frame 13 forwardly of the rearwardmost position of the weighted cart 27 and which is connected to one end, i.e., the bottom, of a double-ended lever 179 which is pivotally mounted for travel of the other or upper end 181 into the path of movement of the weighted cart 27 forwardly from the rearwardmost position. More particularly, the double-ended lever 179 is pivotally mounted intermediate its ends at a point 183 between the pulley 177 and the forward end of the weighted cart 27 when the cart 27 is located in its rearwardmost position. When the arm 167 is in its fully extended position, the chain 173 is pulled rearwardly so as to rotate the lever 179 in the counterclockwise direction as shown in FIG. 3, thereby elevating the upper end 181 of the lever 179 into the path of the weighted cart 27. In turn, the cart 27 includes an arcuate camming surface 187 which, as the cart 27 moves forwardly subsequent to movement of the arm 167 to its fully extended position, engages the upper end 181 of the lever 179 to rotate the lever in the clockwise rotative direction and thereby to pull on the chain 173 so as to gradually elevate the arm 167 to its retracted position. As shown best in FIG. 4, a self-acting retaining clip or lock 189 is mounted on the frame 13 for engagement in an aperture 190 in the arm 167 to releasably hold the arm 167 in its retracted vertical position.

If desired, the arm can be moved between its extended and retracted positions, as and when desired, by an electric motor (not shown) which is battery powered and controlled by the operator.

When a tractor "pull" is about to begin, the device 11 is located next to a temporarily fixed platform 191 (See FIGS. 4 and 5) which is located slightly above the ground and the retaining clip 189 is manually released to permit the arm 167 to swing toward the fully extended position, and to a cocked position until the wheel 169 engages the platform 191. Such movement takes the slack out of the chain 171 connected to the keeper bar 159 without releasing the clutch actuating rod 139 and also serves to, at least partially, position the lever 179 in the path of the weighted cart 27. When the tractor begins to pull, relatively little resistance is initially encountered because the cart 27 is in its rearwardmost position over the wheels 18, 19, 20, and 21. However, as soon as the forward movement of the device 11, under the influence of the tractor, causes the wheel 169 to travel off the platform, the arm 167 drops to its fully extended position, thereby releasing the clutch actuating rod 139 to engage the clutch so as to commence forward movement of the cart 27 along the track 23. Simultaneously, dropping of the arm 167 pulls on the chain 173 so as to fully pivot the lever 179 into position for engagement by the cart 27 as the cart moves forwardly from its rearwardmost position, thereby to subsequently elevate its arm 167 to its retracted position.

Because the forward end of the frame 13 is at a higher elevation over the ground as compared to the rearward end when the device is on level ground, if the clutch is disengaged the cart 27 will tend to move under the influence of gravity from the forward end to the rearward end of the frame 13. In this regard, there is provided, at the rearward end of the weight transfer cart 27, one or more members 193 (See FIGS. 3, 4, and 5) which project downwardly to engage the forward surface of the rear transverse frame member 43 to prevent cart over-travel off the rearward end of the track 23 and to determine the rearwardmost position of the weight transfer cart 27 relative to the frame.

When in its rearwardmost position, the weight transfer cart 27 is located rearwardly of the supporting wheel set 17, thereby tending to minimize any loading of the frame 13 on the sled 15 and thereby providing minimum resistance to pulling at the start of a "pull."

The forwardmost position of the weight transfer cart 27 relative to the frame 13 is determined, and over-travel of the cart 27 at the forward end of the track is prevented, by one or more members 197 (See FIGS. 3 and 5) which depend from the forward end of the weight transfer cart 27 and which are engageable with the rearward surface of the forward transverse frame member 41. When in the forwardmost position, the cart 27 is located somewhat forwardly of the connection between the frame 13 and the sled 15, thereby tending to minimize loading of the frame 13 on the rear wheel set 17 and thereby also increasing the loading on the sled 15 by the frame 13.

In order to prevent excessive speed of the cart 27 relative to the frame 13 when traveling from the forward end to the rearward end under the influence of gravity and, if desired, to entirely prevent movement of the cart 27 from any position on the track 23, the device 11 is provided (See FIGS. 1, 7 and 9) with a hand operated releasable brake 199 which is mounted on the I-beam 37. More particularly, the brake 199 includes a drum 211 which is mounted on a shaft 213 journaled in a bearing 215 for rotation transversely of the I-beam 37. Also carried by the shaft 213 is a sprocket 217 connected by a chain 219 to a sprocket 221 on the output shaft of the combined clutch and transmission unit 73 and adjacent to the sprocket 87 and chain 89 arrangement which connects the output shaft 81 to the drive shaft 71.

Encircling the brake drum is a brake band 227 which can be tightened by a manually operable handle 229. Accordingly, when the brake band 227 is tightened about the brake drum 211, rotation of the drum 211 and of the output shaft 81 and of the drive shaft 71 are prevented, thereby fixedly locating the weight transfer cart 27 on the track 23. Partial tightening of the brake band 227 relative to the drum 211 can be employed to control the rate of travel of the cart 27 under the influence of gravity.

In the event that a power assist is desired to effect movement of the weight transfer cart 27 from the forward end to the rearward end of the frame 13, the device 11 also includes a battery operated electrical winch 229 which is mounted on the frame 13 and is drivingly connected through a solenoid operated clutch 230 and a slip clutch 231 with the shaft 68 on which the rearward sprocket 67 is fixed. Accordingly, energizing of the winch 229 will effect rearward travel of the weight transfer cart 27. However, because of the slip clutch 231, the winch 229 will not interfere with movement of the chain 59 which effects forward weight transfer cart movement.

Means can also be provided for selectively limiting rearward travel of the cart 27 on the frame 13 so as to selectively locate the cart 27 at various different positions relative to the rear wheels 20 and 21 at the start of a tractor "pull." While various arrangements can be employed, in the construction shown in FIG. 7, the I beams 37 and 39 are each provided with a series of spaced apertures 230 which are adapted to receive the transversely spaced feet of a cross bar assembly 232 including a cross beam 234 adapted to engage the cart 27 to prevent further rearward travel. When the cross bar assembly 232 is employed to halt rearward cart travel short of the position shown in FIG. 5, a battery powered electric motor controlled by the operator can be employed to displace the arm 167 as and when desired between the retracted and extended arm positions.

In addition to the first mentioned sled 15, the pulling device is also adapted to employ (See FIG. 1) a second weighted ground engaging sled 237 trailed rearwardly of the frame 13. In accordance with the invention, the rearwardly located sled 237 is connected directly to the forward sled 15 by one or more chains or cables 239. As a result, the resistance to travel which is afforded by rearward sled 237 is not transmitted through the frame 13.

The frame 13 is also desirably provided (See FIG. 1) with a seat 241 adjacent the clutch rod handle 140 so as to support an operator in position to disengage the clutch and employ the brake 199 as may be desired.

Also in accordance with the invention, means are provided for disconnecting the frame 13 from the forward sled 15 and for connecting the frame 13 to an over-the-road towing vehicle (not shown). In this regard, in order to raise the forward end of the frame 13 when the weight transfer cart 27 is in its rearwardmost position and so as to afford disconnection of the frame 13 from the forward sled 15 to facilitate connection to an over-the-road towing vehicle, the frame 13 is provided (See FIG. 1) adjacent the forward end thereof, with a swingably mounted, manually operable jack 243.

When the frame 13 is elevated above and disconnected from the sled 15, the sled 15 is removed from under the forward end of the frame 13 and, if desired, an over-the-road towing tractor with a 5th-wheel can be placed under the forward end of the frame for connection with the king pin whereby to connect the over-the-road towing vehicle (not shown) in towing association with the frame 13 for transport over the road. However, as the power necessary to transport the frame over the road is not too great, towing vehicles in the form of stake trucks with lesser horsepower than over-the-road tractor vehicles can also be employed.

In this regard, underneath each of the I beams 37 and 38, the frame is provided with respective tubular sockets 251 adapted to receive the rearwardly extending legs 253 of a yoke-shaped toe bar 257. In addition, keeper pins 259 are provided for transverse insertion through the sockets 251 and the legs 253 to prevent disconnection of the toe bar 257 from the frame 13.

More specifically, the toe bar legs 253 are connected at their forward ends, by struts 261 to a vertically extending channel member 263 having vertically adjustably located therein a forwardly open U-shaped bracket 267 with horizontally extending apertured legs 269 permitting insertion of a king pin (not shown) for connection to a towing truck (not shown) having a suitably formed and apertured tongue enterable between the legs 269.

During over-the-road transport, the weight transfer cart 27 is located in its rearwardmost position and, the arm 167 is located in retracted position with the clutch disengaged, and the brake 199 is set to prevent movement of the weight transfer cart 27. In addition, the sled or sleds 15 or 237 can either be secured on the top of the frame 13 forwardly of the weight transfer cart 27 or, when a stake truck is employed, the sled or sleds 15 and 237 can be carried directly on the bed of the stake truck.

Various of the features of the invention are set forth in the following claims.

What is claimed is:

1. A device adapted to be pulled by a tractor, said device comprising a frame adapted to be pulled by the tractor, a wheel in engagement with the ground and supporting said frame, a track on said frame, a cart movable along said track, and drive means connectable between said wheel and said cart for moving said cart along said track in response to travel of said wheel over the ground said drive means including a clutch affording selective engagement to connect and disconnect said cart with said wheel and actuating means for engaging said clutch, said actuating means being selectively movable between a storage position and a cocked position and being adapted to be further movable from the cocked position to a position automatically engaging said clutch in response to initial travel of said wheel over the ground.

2. A device in accordance with claim 1 wherein said drive means for moving said cart along said track includes means for adjustably varying the rate of travel of said cart in response to movement of said wheel.

3. A device in accordance with claim 1 including a sled engaged with the ground and supporting the forward end of said frame.

4. A device in accordance with claim 3 wherein said forward end of said frame is normally located at a greater distance above the ground than the rearward end.

5. A device in accordance with claim 3 wherein said frame includes at the forward end thereof means for pivotally connecting said frame to a tractor vehicle for over-the-road transport.

6. A device in accordance with claim 1 wherein said drive means for moving said cart is operable to move said cart from the rearward end to the forward end of said frame in response to forward movement of said device over the ground.

7. A device in accordance with claim 6 further including a winch for moving said cart from the forward end to the rearward end of said frame.

8. A device in accordance with claim 1 including means for braking travel of said cart on said track.

9. A device in accordance with claim 1 including generally horizontal means at the front end of said frame for supporting removable weights and means on said cart similar to said means on said forward end of said frame for supporting removable weights.

10. A device adapted to be pulled by a tractor, said device comprising a frame, a wheel in engagement with the ground and supporting said frame, a track on said frame, a cart movable along said track, and drive means connectable between said wheel and said cart for moving said cart along said track in response to travel of said wheel over the ground, said drive means including a clutch affording selective engagement to connect and disconnect said cart with said wheel, said clutch including an arm movable between first and second positions, means connecting said arm to said clutch to effect engagement of said clutch upon complete movement of said arm to said first position, and means operably connectable between said arm and said movable cart for moving said arm from said first position to said second position upon movement of said cart along said track.

11. A device adapted to be pulled by a tractor, said device comprising a frame adapted to be pulled by the tractor, a wheel in engagement with the ground and supporting the rearward end of said frame, a track on said frame, a cart movable along said track, drive means connectable between said wheel and said cart for moving said cart along said track in response to travel of said wheel over the ground, a first sled engaged with the ground and supporting the forward end of said frame, means on said first sled connectable to a tractor for pulling of said device, a second sled rearwardly of said frame for providing additional resistance to movement, and means directly connecting said first sled to said second sled independently of said frame.

12. A device adapted to be pulled by a tractor, said device comprising a frame adapted to be pulled by the tractor, a wheel in engagement with the ground and supporting the rearward end of said frame, a track on said frame, a cart movable along said track, drive means connectable between said wheel and said cart for moving said cart along said track in response to travel of said wheel over the ground, socket means on the front of said frame on each side thereof, a yoke-shaped member having spaced legs insertable in said socket means, means for connecting said yoke-shaped member to a towing vehicle for pivotal movement of the device relative to the towing vehicle during over-the-road transportation, and means releasably preventing disconnection of said yoke legs from said socket means.

* * * * *